United States Patent [19]

Takahashi et al.

[11] Patent Number: 5,624,484
[45] Date of Patent: Apr. 29, 1997

[54] LIQUID COMPOSITION AND INK SET, AND IMAGE-FORMING PROCESS AND APPARATUS USING THE SAME

[75] Inventors: Katsuhiko Takahashi, Yokohama; Yutaka Kurabayashi, Tokorozawa, both of Japan

[73] Assignee: Canon Kabushiki Kaisha, Tokyo, Japan

[21] Appl. No.: 499,007

[22] Filed: Jul. 6, 1995

[30] Foreign Application Priority Data

Jul. 11, 1994 [JP] Japan ................. 6-180473
Jul. 3, 1995 [JP] Japan ................. 7-187659

[51] Int. Cl.$^6$ ............................. C09D 11/02
[52] U.S. Cl. ........................ 106/31.75; 106/31.86
[58] Field of Search ................ 106/20 R, 22 H, 106/23 H, 20 D, 22 R

[56] References Cited

U.S. PATENT DOCUMENTS

| | | | |
|---|---|---|---|
| 5,019,164 | 5/1991 | Tomita et al. | 106/20 R |
| 5,053,495 | 10/1991 | Greenwood et al. | 106/22 K |
| 5,107,224 | 5/1991 | Tomita et al. | 106/20 R |
| 5,203,912 | 4/1993 | Greenwood et al. | 106/22 K |
| 5,415,686 | 5/1995 | Kurabayashi et al. | 106/26 R |
| 5,439,515 | 8/1995 | Kurabayashi et al. | 106/20 R |

FOREIGN PATENT DOCUMENTS

| | | |
|---|---|---|
| 55-66976 | 5/1980 | Japan . |
| 55-65269 | 5/1980 | Japan . |
| 61-59914 | 12/1986 | Japan . |
| 61-59912 | 12/1986 | Japan . |
| 61-59911 | 12/1986 | Japan . |
| 63-299971 | 12/1988 | Japan . |
| 64-9279 | 1/1989 | Japan . |
| 64-63185 | 3/1989 | Japan . |

*Primary Examiner*—Helene Klemanski
*Attorney, Agent, or Firm*—Fitzpatrick, Cella, Harper & Scinto

[57] ABSTRACT

Disclosed herein is a liquid composition comprising a cationic substance, wherein the liquid composition contains polyallylamine as the cationic substance, and glycerol, the essential component as a water-soluble organic solvent, in an amount of not less than 5% by weight based on the total weight of the liquid composition.

39 Claims, 5 Drawing Sheets

MOVING DIRECTION OF CARRIAGE

LIQUID COMPOSITION AND INK SET, AND IMAGE-FORMING PROCESS AND APPARATUS USING THE SAME

BACKGROUND OF THE INVENTION

1. Field of the Invention

The present invention relates to a technique capable of lessening so-called color bleeding (phenomenon) which occurs upon the formation of color images on plain paper with inks and for providing images high in water fastness. In particular, this invention relates to a liquid composition suitable for use in the formation of images making good use of an ink-jet system. In addition, the invention includes an ink set comprising in combination this composition and at least one ink, and an image-forming process and apparatus to which these liquid composition and ink set are applied.

2. Related Background Art

An ink-jet recording method is a system in which recording is conducted by ejecting droplets of ink to apply them to a recording medium such as paper. In particular, according to the methods disclosed in Japanese Patent Publication Nos. 61-59911, 61-59912 and 61-59914, an electrothermal converter is used as an ejection-energy supply means to apply thermal energy to an ink so as to generate bubbles, thereby ejecting droplets of the ink. The formation of a high-density multi-orifice recording head can be realized with ease, and high-resolution and high-quality images can be recorded at high speed.

However, the conventional inks used in ink-jet recording generally comprise, as a principal component, water, and include additionally a water-soluble high boiling solvent such as glycol for the purpose of preventing drying and clogging at orifices, and the like. When such an ink has been used to conduct recording on plain paper, there exist problems that fixing ability cannot be sufficiently achieved, and image irregularity occurs, which appears to be attributed to the uneven distribution of the filler and size on the surface of the recording paper. In particular, when color images are intended to form, plural inks of different colors are overlapped one after another before they are fixed to paper. Therefore, color bleeding and uneven color mixing have occurred at portions of boundaries between images of different colors (this phenomenon will hereinafter be referred to as "bleeding" simply), resulting in a failure to obtain satisfactory images.

As a means for enhancing fixing ability of inks, Japanese Patent Application Laid-Open No. 55-65269 discloses the addition of a compound capable of enhancing penetrability, such as a surfactant, into the inks. Besides, Japanese Patent Application Laid-Open No. 55-66976 discloses the use of inks comprising, as a principal component, a volatile solvent. However, the former method, in which the compound capable of enhancing penetrability added into the inks, has involved a disadvantage that although the penetrability of the inks into recording paper is improved, and so the fixing ability and anti-bleeding property of the inks are improved to some extent, the image density and saturation of the resulting image are lowered because coloring materials contained in the inks also penetrate deeply into the recording paper. In addition, the inks also have the problem that they spread in lateral directions, resulting in reduction of edge sharpness and resolution. On the other hand, in the latter method, in which the inks comprising, as a principal component, the volatile solvent are used, clogging due to the evaporation of the solvent in a nozzle of a recording head occurs in addition to the above-described disadvantages of the former method. Such methods have hence not been preferred.

In order to improve the above-described problems, there have been further disclosed methods in which a liquid, which can make the quality of images better, is applied to a recording medium prior to the jetting of an ink.

For example, Japanese Patent Application Laid-Open No. 63-299971 discloses a method in which a liquid comprising an organic compound having two or more cationic groups per molecule is applied to a recording medium, and recording is then conducted with inks comprising an anionic dye. Japanese Patent Application Laid-Open No. 64-9279 discloses a method in which an acidic liquid containing succinic acid or the-like is applied to a recording medium, and recording is then conducted with inks comprising an anionic dye. Further, Japanese Patent Application Laid-Open Nos. 64-63185 discloses a method in which a liquid, which insolubilizes dyes, is applied to a recording medium prior to recording.

However, all these methods intend to prevent bleeding of images or improve the water fastness of images owing to the deposition of the dyes themselves in the inks. Therefore, these methods are still incapable of preventing the above-described bleeding between inks of different colors. More over, these methods suffer poor coverability of the inks on pulp fibers in the recording paper because the dyes deposited tend to distribute unevenly on the recording paper, resulting in reduction of evenness of images.

SUMMARY OF THE INVENTION

With the foregoing circumstances in view, it is therefore an object of the present invention to satisfy the following five requirements. Namely, in order to conduct ink-jet recording on plain paper, it is necessary to satisfy the following two requirements:

(1) being able to provide images good in image quality while keeping good fixing ability; and (2) being able to achieve sufficient image density and provide solid printed images high in evenness.

In particular, upon formation of color images on plain paper, it is also necessary to satisfy the following three requirements:

(3) being able to prevent bleeding;

(4) being excellent in color reproductivity and being able to provide high-definition images; and (5) being able to achieve perfect water fastness of recorded images.

Another object of the present invention is to prevent the crusting of a liquid composition to be used for achieving the above object so as to effectively prevent its clogging in an ink-jet nozzle.

The above objects can be achieved by the present invention described below.

According to the present invention, there is thus provided a liquid composition comprising a cationic substance, wherein the liquid composition contains polyallylamine as the cationic substance, and glycerol, the essential component as a water-soluble organic solvent, in an amount of not less than 5% by weight based on the total weight of the liquid composition.

According to the present invention, there is also provided an ink set comprising in combination the liquid composition described above and at least one of yellow, magenta, cyan, black, red, blue and green inks.

According to the present invention, there is further provided an ink set comprising in combination the liquid composition described above and three inks of yellow, magenta and cyan colors.

According to the present invention, there is still further provided an ink set comprising in combination the liquid composition described above and four inks of yellow, magenta, cyan and black colors.

According to the present invention, there is yet still further provided a process of forming an image, which comprises the steps of (A) applying the liquid composition described above to at least an image-forming region on a recording medium and (B) applying an ink comprising an anionic compound to the recording medium by an ink-jet system.

According to the present invention, there is yet still further provided an image-forming apparatus comprising one of the above-described ink sets and an ink-jet means.

According to the present invention, there is yet still further provided an image-forming apparatus comprising a first recording unit equipped with a container part containing the liquid composition described above and an ejection means therefor, and a second recording unit equipped with container parts separately containing inks comprising an anionic compound and ejection means therefor.

DESCRIPTION OF THE PREFERRED EMBODIMENTS

The function of the liquid composition according to the present invention will be first described with reference to the accompanying FIGS. 9A to 9E.

Figure 9A:
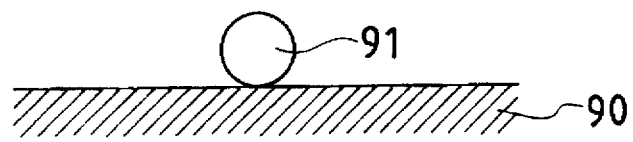
FIGS. 9A, 9B, 9C, 9D and 9E conceptually illustrate an image-forming process according to the present invention.
Figure 9B:
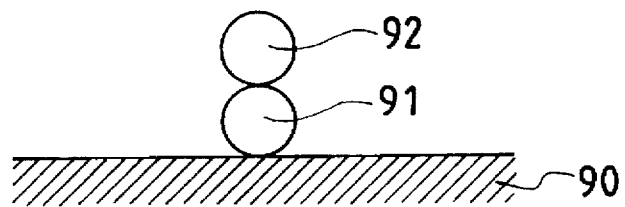
Figure 9C:
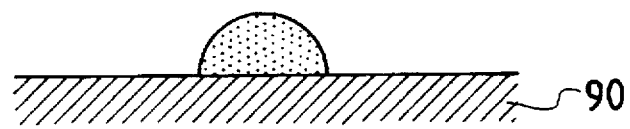
Figure 9D:
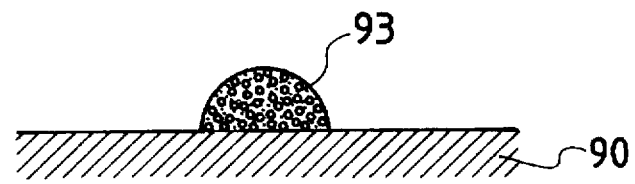
Figure 9E:
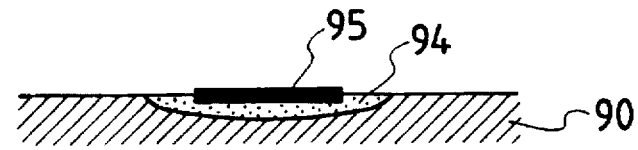

FIG. 9A shows a moment when a liquid composition 91 is applied on a recording medium 90. FIG. 9B shows that recording by an ink 92 is carried out. FIG. 9C shows that a liquid composition and an ink are mixed together and dye in the ink aggregates momentarily, but the aggregates are small. FIG. 9D shows a state where the aggregates grow to form an associated ion-pair 93. FIG. 9E shows a state where a liquid component is separated from a solid component and only a solvent 94 penetrates into the recording medium, as a result, a coloring material 95 remains on the surface of the recording medium.

In the case where the liquid composition containing the cationic substance according to the present invention is used together with, for example, an ink comprising, as a coloring matter, a dye containing an anionic group, they are mixed on recording paper or at a position penetrated in the recording paper. As a result, as the first step of the reaction, a low-molecular weight component of the cationic substance, for example, low-molecular weight polyallylamine (allylamine oligomer) or a cationic surfactant, which is contained in the liquid composition, associates with the anionic compound in the ink owing to ionic interaction as illustrated in FIG. 9C, so that the dye momentarily aggregates so as to separate from its solution phase.

As the second step of the reaction, an aggregate formed from the anionic compound and the low-molecular weight cationic substance is adsorbed on the high-molecular weight component contained in the liquid composition. Therefore, the aggregates of the dye formed by the association further increase in size as illustrated in FIG. 9D, and become difficult to enter the interfiber spaces of the recording paper. As a result, only the liquid component separated from the solid component penetrates into the recording paper as illustrated in FIG. 9E, whereby improved print quality with improved fixing ability can be achieved.

At the same time, the aggregates formed from the low-molecular weight component of the cationic substance, the anionic compound and the high-molecular weight component (polyallylamine) of the cationic substance by the above-described mechanism increase in viscosity and hence do not move with the movement of the liquid medium. Accordingly, inks of different colors are not mixed with each other even if adjoining dots are formed by these inks unlike the conventional formation of a full-color image as described above, so bleeding does also not occur. Since the aggregates are insoluble in water in themselves, the image formed comes to have perfect water fastness. In addition, the image formed is also improved in light fastness owing to the shielding effect of the polymer.

The action and effect of glycerol as a water-soluble organic solvent in an amount of not less than 5% by weight, and at least one water-soluble organic solvent selected from the group consisting of ethylene glycol, diethylene glycol and thiodiglycol contained in the cationic substance-containing liquid composition according to the present invention are as follows. In the case where polyallylamine having high cationic nature and capable of exhibiting excellent function is used as the cationic substance having the above-described function, the prevention of crusting of the liquid composition comprising the polyallylamine is achieved by selecting at least one of these water-soluble organic solvents to contain it in combination with the polyallylamine. As a result, no clogging in a nozzle of an ink-jet recording apparatus occurs when the liquid composition is ejected out of the nozzle, so stable recording can be achieved.

The preferred embodiments of the present invention will now be described to explain the present invention in more detail.

The liquid composition according to the present invention is a liquid composition comprising a cationic substance, wherein the liquid composition contains polyallylamine as an essential component, glycerol as a water-soluble organic solvent in an amount of not less than 5% by weight and further at least one water-soluble organic solvent selected from the group consisting of ethylene glycol, diethylene glycol and thiodiglycol.

A liquid composition according to a more preferred embodiment may contain, as the cationic substance, a cationic substance having a molecular weight distribution in which each at least one peak exists in the following molecular weight regions (1) and (2) of the cationic substance as determined by means of GPC (gel permeation chromatography). It is particularly preferable that both peaks existing in these molecular weight regions (1) and (2) in the molecular weight distribution be attributable to polyallylamine. It is also preferable to use a cationic surfactant having a peak of a molecular weight distribution in the following molecular weight region (1).

(1) A low-molecular weight cationic substance which has its peak molecular weight distribution at a molecular weight region of at most 1,000, preferably from 100 to 700 as determined by GPC.

(2) A high-molecular weight cationic substance which has its peak molecular weight distribution AT a molecular weight region of not lower than 1,500 but not higher than 10,000 as determined by GPC.

The term "molecular weight" as used in the present invention means a molecular weight determined in terms of polyethylene oxide unless expressly noted.

The ink sets according to the present invention are characterized by the use of the liquid composition according to the present invention as described above. It is preferable to use, as recording color inks used together with the liquid composition, inks comprising a dye containing an anionic group (may hereinafter referred to as "dye inks"), or inks comprising an anionic compound and a pigment (may hereinafter referred to as "pigment inks").

The components of the liquid composition according to the present invention will hereinafter be described.

The liquid composition according to the present invention is required to comprise a cationic substance, and contains, as an essential component, polyallylamine, a sort of cationic substance. No particular limitation is imposed on the molecular weight and content of the polyallylamine to be used so far as it permits the achievement of the intended objects of the present invention. It is however preferable to use polyallylamine having a molecular weight distribution in which each at least one peak exists in the molecular weight regions (1) and (2).

In addition, it is preferable to use, in combination with polyallylamine, a cationic surfactant different from the polyallylamine as the low-molecular weight cationic substance (1) the peak of a molecular weight distribution of which exists in a molecular weight region of at most 1,000.

The action and effect of the above-described liquid composition are as described above. More specifically, the cationic substance such as polyallylamine is contained in the liquid composition. For example, the low-molecular weight cationic substance the peak of which has a molecular weight distribution in a molecular weight region of 1,000 or lower as described in the component (1) first associates with the anionic compound contained together with a coloring material such as a dye in the ink. The ionic interaction then forms aggregates when the liquid composition is mixed with the ink on a recording medium. The rate of this aggregate-forming reaction must be extremely fast so as to momentarily take place.

Here, the low-molecular weight cationic substance whose peak of a molecular weight distribution exists in a molecular weight region of at most 1,000, preferably from 100 to 700 as described in the component (1) will be described. Specifically, those mentioned below may be used. As preferable specific examples thereof, may be mentioned compounds of the primary, secondary and tertiary amine salt types, specifically, the hydrochlorides, acetates and the like of polyallylamine (allylamine oligomers), laurylamine, coconut amine, stearylamine, rosin amine and the like; compounds of the quaternary ammonium salt type, specifically, cetyltrimethylammonium chloride, lauryltrimethylammonium chloride, lauryldimethylbenzylammonium chloride, benzyltributylammonium chloride, benzalkonium chloride and the like; pyridinium salt type compounds, specifically, cetylpyridinium chloride, cetylpyridinium bromide and the like; imidazoline type cationic compounds, specifically, 2-heptadecenylhydroxyethylimidazoline and the like; and ethylene oxide adducts of higher alkylamines, specifically, dihydroxyethylstearylamine and the like.

In the present invention, amphoteric surfactants exhibiting cationic properties in a certain pH region may also be preferably used as the low-molecular weight cationic substance. As specific examples thereof, may be mentioned carboxylic acid type amphoteric surfactants such as amino acid type amphoteric surfactants, compounds of the R—NH—CH$_2$—CH$_2$—COOH type, betaine type compounds, specifically, stearyldimethylbetaine, lauryldihydroxyethylbetaine and the like; and besides amphoteric surfactants of the sulfuric ester type, sulfonic acid type, phosphoric ester type and the like. If these amphoteric surfactants are used, it goes without saying that the liquid composition according to the present invention must be adjusted either so as to have a pH not higher than their isoelectric point or so as to reach the pH not higher than the isoelectric point when mixed with the ink on a recording medium.

Although the examples of the low-molecular weight cationic compound as the cationic substance according to the present invention have been mentioned above, it goes without saying that cationic compounds usable in the present invention are not always limited to these compounds.

The action and effect of the high-molecular weight cationic substance whose peak of a molecular weight distribution exists in a molecular weight region of not lower than 1,500 but not higher than 10,000 as described in the component (2), for example, high-molecular weight polyallylamine, are also as described above. More specifically, as the second step of the reaction of the liquid composition with the ink, the aggregates of the above-described dye containing an anionic group and the low-molecular weight component (1) of the cationic substance formed by the association are adsorbed into its molecule to increase the size of the aggregates of the dye formed by the association so as to become difficult to enter the interfiber spaces of the recording paper. Therefore only the liquid component separated from the solid component penetrates into the recording paper to achieve the compatibility of improved print quality with improved fixing ability.

Examples of the polyallylamine used in the present invention with the action and effect as described above include those of the hydrochloride type and acetate type. It goes without saying that the high-molecular weight cationic substance is not limited to these substances.

The amount of the above-described cationic components to be contained in the liquid composition according to the present invention may preferably be within a range of from 0.05 to 20% by weight, more preferably from 0.5 to 10% by weight based on the total weight of the liquid composition. It is however necessary to determine an optimum range according to the combination of the individual substances to be used. When the low-molecular weight cationic surfactant is contained in the liquid composition, the mixing ratio of the cationic surfactant to the polyallylamine in the liquid composition is within a range of from 10:1 to 1:10, preferably from 5:1 to 1:5 by weight. If this ratio exceeds 10:1, sufficient water fastness cannot be given to the resulting print. On the other hand, if the ratio is lower than 1:10, the prevention of bleeding becomes insufficient, and the edge sharpness of images formed tends to be reduced at the same time. Incidentally, the content of the cationic surfactant may preferably be within a range of from 0.05 to 10% by weight.

Glycerol, which is another essential component used in combination with the polyallylamine in an amount of not less than 5% by weight in the liquid composition according to the present invention, has an effect of effectively preventing the crusting of the liquid composition when contained in the liquid composition in combination with the polyallylamine. It is preferable to use concurrently at least one water-soluble organic solvent selected from the group consisting of ethylene glycol, diethylene glycol and thiodiglycol. The water-soluble organic solvent used in the present invention may preferably be glycerol and at least one water-soluble organic solvent selected from the group consisting of ethylene glycol, diethylene glycol and thiodiglycol. However, those other than these solvents may also be used so far as they give the polyallylamine flowability and generate no deposit even in the absence of water.

With respect to the content of these water-soluble organic solvents, it may preferably be within a range of from 5 to 30% by weight, more preferably from 5 to 15% by weight for glycerol, and it may preferably be within a range of from 5 to 40% by weight, more preferably from 5 to 20% by weight for at least one water-soluble organic solvent selected from the group consisting of ethylene glycol, diethylene glycol and thiodiglycol, based on the total weight of the liquid composition.

Other components making up the liquid compositions according to the present invention will now be described specifically.

Besides the above polyallylamine, glycerol and at least one water-soluble organic solvent selected from the group consisting of ethylene glycol, diethylene glycol and thiodiglycol, the liquid compositions according to the present invention may suitably contain additives such as a viscosity modifier, pH adjustor, antiseptic, various surfactants, antioxidant and evaporation accelerator as needed. The selection of the surfactants is particularly important from the viewpoint of controlling the penetrability of the liquid compositions.

The liquid compositions according to the present invention may preferably be colorless, but may be slightly colored within limits not changing the color tones of color inks when mixed with the respective inks on a recording medium or the like. With respect to preferable physical property ranges at about 25° C. of the liquid compositions, the pH may be within a range of from 3 to 12, preferably from 3 to 8, more preferably from 3 to 5, the surface tension may be within a range of from 10 to 60 dye/cm, preferably 10 to 40 dye/cm, and the viscosity may be within a range of from 1 to 30 cP. Incidentally, the surface tensions of the liquid compositions according to the present invention may preferably be lower than those of inks used together with the liquid compositions though described below.

With respect to the molecular weight distribution of the cationic compounds used in the present invention, the individual compounds may be subjected to GPC measurement in advance. Alternatively, the molecular weight distribution may be determined in the following manner. Namely, after the molecular weight distribution of the liquid composition itself is determined, a sufficient amount of the ink comprising a dye having an anionic group is mixed under stirring with the liquid composition in a beaker, and precipitate formed is removed. Thereafter, the GPC measurement is conducted again to compare the measurement results before the mixing of the ink and after the mixing of the ink and the removal of the precipitate with each other. Thus, the molecular weight distribution of the cationic compound is found from the molecular weight distribution of the component precipitated by the dye in the ink and removed from the system.

Inks making up the ink sets according to the present invention will now be described.

The inks used in the present invention separately use, as a coloring material, a water-soluble dye containing an anionic group, or a pigment. In the case where the pigment is used as a coloring material, an anionic compound is used in combination. Besides this coloring material, such inks used in the present invention may further comprise water, a water-soluble organic solvent and other components. For example, a viscosity modifier, pH adjustor, antiseptic, surfactant and antioxidant can be added as needed. As the water, it is preferable to use ion-exchanged water (deionized water) instead of tap water containing various ions.

No particular limitation is imposed on the water-soluble dyes containing an anionic group used in the present invention so far as they are water-soluble acid dyes, direct dyes or reactive dyes, which are described in COLOR INDEX. Any dye not described in COLOR INDEX may also be used without any particular limitation so far as it has an anionic group, for example, a sulfonic group or a carboxylic group. Among the water-soluble dyes used herein, those having dependence of solubility on pH may also be included as a matter of course.

As the water-soluble organic solvents contained in the inks comprising the water-soluble dye as the coloring material as described above, there may preferably be used amides such as dimethylformamide and dimethylacetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol, 1,2,6-hexanetriol, lower alkyl ethers of polyhydric alcohols, such as ethylene glycol methyl ether, diethylene glycol monomethyl ether and triethylene glycol monomethyl ether, and monohydric alcohols such as ethanol, isopropyl alcohol, n-butyl alcohol and isobutyl alcohol, and besides, glycerol, N-methyl-2-pyrrolidone, 1,3-dimethylimidazolidinone, triethanolamine, sulfolane, dimethyl sulfoxide and the like.

No particular limitation is imposed on the content of the water-soluble organic solvents. However, it may preferably be within a range of from 5 to 60% by weight, more preferably from 5 to 40% by weight based on the total weight of the ink.

With respect to the surface tension of each of the thus-obtained inks comprising the dye as a coloring material, it is preferable that the surface tension of the ink be made higher than that of the liquid composition because such adjustment may be effective in the practice of the image-forming process according to the present invention. This is considered to be due to the fact that if the surface tensions of both ink and liquid composition are adjusted in this manner, the liquid composition has an effect to make the wettability of the ink to be shot later on a recording medium even. However, particulars are not clarified.

In the case where a pigment is used as a coloring matter in the ink used in the present invention, the pigment is used within a range of from 1 to 20% by weight, preferably from 2 to 12% by weight based on the total weight of the ink.

As a specific example of the pigment used in a black ink in the present invention, carbon black may be used. As such carbon black, there may preferably be used those produced in accordance with the furnace process or channel process and having such properties that the primary particle diameter is 15 to 40 μm, the specific surface area is 50 to 300 m²/g as determined in accordance with the BET method, the oil absorption is 40 to 150 ml/100 g as determined by using DBP, the volatile matter is 0.5 to 10%, and the pH is 2 to 9. Examples of commercially-available carbon black having such properties include No. 2300, No. 900, MCF 88, No. 33, No. 40, No. 45, No. 52, MA 7, MA 8 and No. 2200B (all, products of Mitsubishi Chemical Industries Limited), RAVEN 1255 (product of Columbian Carbon Japan Limited), REGAL 400R, REGAL 330, REGAL 660R and MOGUL L (all, products of Cabot Company), and Color Black FW1, Color Black FW18, Color Black S170, Color Black S150, Printex 35 and Printex U (all, products of Degussa). All these commercially-available carbon black products may preferable be used.

As examples of pigments used in yellow, magenta and cyan inks, may be mentioned C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83; C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 and C.I. Pigment Red 122; and C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6, respectively. However, the pigments are not limited to these pigments. It goes without saying that those newly prepared for the practice of the present invention may also be used in addition to the above pigments.

As a dispersant contained in the ink in the case where the pigment is used, any resin may be used so far as it is soluble in water. However, those having a weight average molecular weight ranging from 1,000 to 30,000, more preferably from 3,000 to 15,000 may preferably be used. Specific examples of such dispersants include block copolymers, random copolymers and graft copolymers composed of at least two monomers (at least one monomer being hydrophilic) selected from styrene, styrene derivatives, vinylnaphthalene, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide and derivatives thereof, and the like, and salts of these copolymers. Besides, natural resins such as rosin, shellac and starch may also preferably be used. These resins are alkali-soluble resins which dissolve in an aqueous solution of a base. These water-soluble resins used as a pigment dispersant may preferably be contained in a range of from 0.1 to 5% by weight based on the total weight of the ink.

In the case of the pigment ink as described above, it is desirable that the ink be adjusted to neutrality or alkalinity as the whole because the solubility of the water-soluble resin used as the pigment dispersant is enhanced, so that the ink can be provided as an ink far excellent in long-term storability. In this case, it is more desirable that the pH be adjusted to a range from 7 to 10 because too high AN alkalinity causes various parts used in an ink-jet recording apparatus to be corroded.

Examples of a pH adjustor used in such a case include various kinds of organic amines such as diethanolamine and triethanolamine, inorganic alkalis such as the hydroxides of alkali metals, for example, sodium hydroxide, lithium hydroxide and potassium hydroxide, organic acids, and mineral acids. The pigment and the water-soluble resin as a dispersant as described above are dispersed or dissolved in an aqueous medium.

An aqueous medium suitable for use in the inks comprising the pigment, which are employed in the present invention, is a mixed solvent of water and a water-soluble organic solvent. As the water, it is preferable to use ion-exchanged water (deionized water) instead of tap water containing various ions.

As examples of the water-soluble organic solvent used in combination with water, may be mentioned alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; and 1,3-dimethyl-2-imidazolidinone. Among a number of these water-soluble organic solvents, polyhydric alcohols such as diethylene glycol and lower alkyl ethers of polyhydric alcohols, such as triethylene glycol monomethyl (or monoethyl) ether are preferred.

The content of the water-soluble organic solvent in the ink is generally within a range of from 3 to 50%, preferably from 3 to 40% by weight based on the total weight of the ink, while the content of water used is within a range of from 10 to 90% by weight, preferably from 30 to 80% by weight based on the total weight of the ink.

Besides the above components, a surfactant, antifoaming agent, antiseptic and the like may be suitably added to the pigment inks used in the present invention, as needed, to provide them as inks having desired physical properties. Such a water-soluble dye as described above and/or the like may also be suitably added as a coloring material in addition to the pigment. As with the dye inks, it is preferable that the surface tension of the ink be higher than that of the liquid composition according to the present invention even when the pigment ink is used. It is therefore preferable that the surface tension of the ink be adjusted so with the surfactant and/or the like to be contained in the ink.

Each of the pigment inks as described above is prepared in the following manner. The pigment is first added to an aqueous medium containing at least the water-soluble resin as a dispersant and water, and the mixture is stirred. A dispersion treatment is then conducted in accordance with a dispersing technique described below, and as needed, a centrifugation is carried out to obtain a desired dispersion. A size and the optional additive components as mentioned above are then added to the dispersion. The resultant mixture is stirred to prepare an ink used in the present invention.

If the alkali-soluble resin is used as a dispersant, it is necessary to add a base for dissolving the resin in the dispersion. Preferable examples of the base used in this case include organic amines such as monoethanolamine, diethanolamine, triethanolamine and aminomethylpropanol, ammonia, and inorganic bases such as potassium hydroxide and sodium hydroxide.

In the preparation process of the pigment inks, it is effective to conduct premixing for at least 30 minutes before the aqueous medium containing the pigment is stirred to subject it to a dispersion treatment. This premixing is preferred because it serves to improve the wettability of the surface of the pigment and facilitate adsorption of the dispersant on the pigment surface.

Any dispersing machine routinely used may be employed as a dispersing machine used in the dispersion treatment of the pigment. As examples thereof, ball mills, roll mills and sand mills may be used. Of these mills, a high-speed sand mill may preferably be used. Examples thereof include Super Mill, Sand Grinder, Beads Mill, Agitator Mill, Grain Mill, Dyno Mill, Pearl Mill and Coball Mill (all, trade names).

In the case where the pigment inks are used in an ink-jet recording method, a pigment having an optimum particle size distribution must be used from the viewpoint of resistance to clogging. As methods of obtaining a pigment having a desired particle size distribution, techniques may be used in which the size of a grinding medium in a dispersing machine is made smaller, in which the packing rate of a grinding medium is made higher, in which processing time is made longer, in which discharging rate is made lower, and in which classification is conducted by filter, centrifugal separator or the like after grinding. Any combination thereof may also be included.

In the case where the pigment inks are used in the present invention, it is preferable to add an anionic compound such as an anionic surfactant or an anionic polymeric substance to the inks in addition to the components described above. In particular, it is essential to add such an anionic substance when no anionic compound is used as a dispersant. At this time, the amount of the anionic substances to be added should be within a range of from 0.05 to 10% by weight, preferably from 0.2 to 5% by weight based on the total weight of the ink. Incidentally, even in the case where the dye inks described above are used, such addition is preferred because the effects of the present invention can be brought about more effectively.

It is also preferable to contain an amphoteric surfactant in the ink after adjusting it to a pH not higher than its isoelectric point. As preferable examples of the anionic surfactant used at this time, may be mentioned those commonly used in inks, such as carboxylic acid salt type, sulfuric acid ester type, sulfonic acid salt type and phosphoric acid ester type. As examples of the anionic polymeric substance, may be mentioned alkali-soluble resins, specifically, sodium polyacrylate and copolymers obtained by copolymerizing acrylic acid in a part of a polymer. It goes without saying that such compounds are not limited to these compounds.

The image-forming process according to the present invention will now be described. The image-forming process according to the present invention comprises the steps of (A) applying the above-described liquid composition to an image-forming region or the image-forming region and the vicinity of the image-forming region on a recording medium and (B) ejecting an ink comprising a dye containing an anionic group or an ink comprising an anionic compound and a pigment in the form of ink droplets on the recording medium from an ejection orifice in accordance with a recording signal.

The term "image-forming region" as used herein means a region of a recording medium, to which dots of the ink are applied, while the term "the vicinity of the image-forming region" means an outside region about 1 to 5 dots away from the region to which dots of the ink are applied.

Any method may be used as the image-forming method according to the present invention so far as it is a method in which the liquid composition and ink according to the present invention can coexist on a recording medium. No problem arises if either of the liquid composition or the ink is first applied to the recording medium. In the case where the liquid composition is first applied to the recording medium, no particular limitation is imposed on the time required from the time the liquid composition is applied to the recording medium up to the time the ink is then applied. However, it is preferable to apply the ink to the recording medium at substantially the same time or within several seconds.

No particular limitation is imposed on the recording medium used in the image-forming process, and the so-called plain paper such as paper for copying and bond paper, which are routinely used, are preferably used. It goes without saying that coated paper specially prepared for ink-jet recording, and transparent films for OHP may also be suitably used, and besides general-purpose woodfree paper and glossy paper may also be suitably used.

As a method for applying the liquid composition to the recording medium, one can apply the liquid composition to the whole surface of the recording medium by a sprayer, roller or the like. However, the application is preferably carried out by an ink-jet system by which the liquid composition can be applied selectively and evenly only to the image-forming region where the ink will be applied, and the vicinity of the image-forming region. At this time, various kinds of ink-jet recording systems may be used. However, a system in which bubbles generated by thermal energy are used to eject droplets is particularly preferred.

Figure 1:
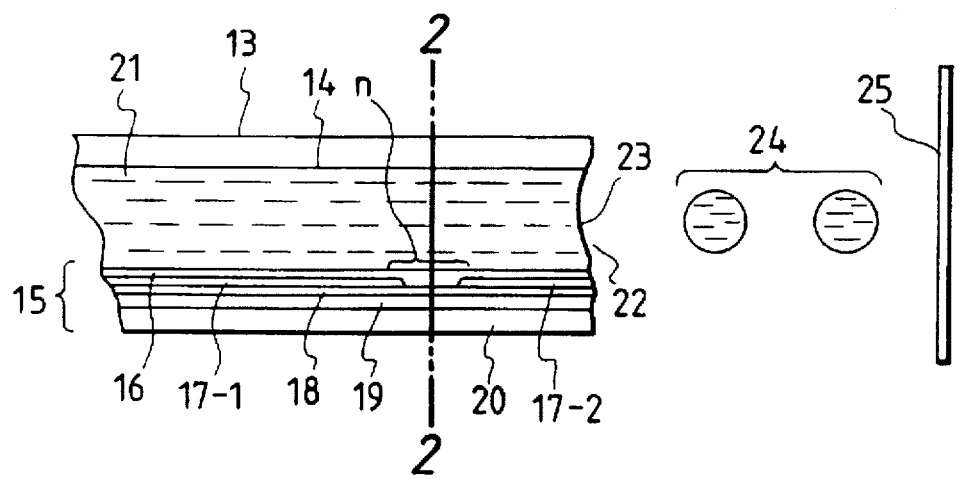
FIG. 1 is a longitudinal cross-sectional view of a head of an ink-jet recording apparatus.
Figure 2:
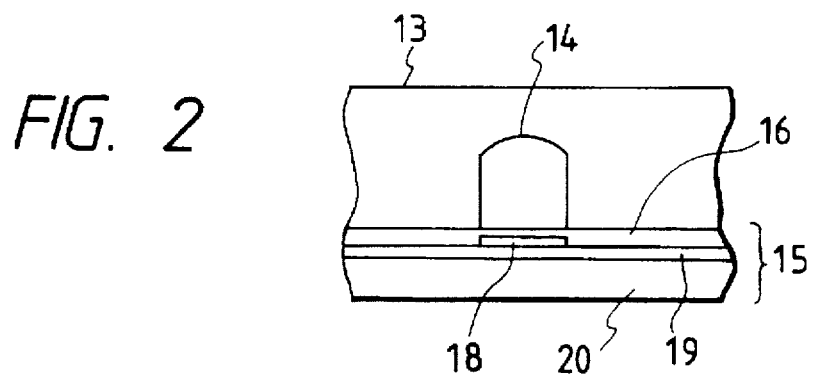
FIG. 2 is a transverse cross-sectional view of the head of the ink-jet recording apparatus.
Figure 3:
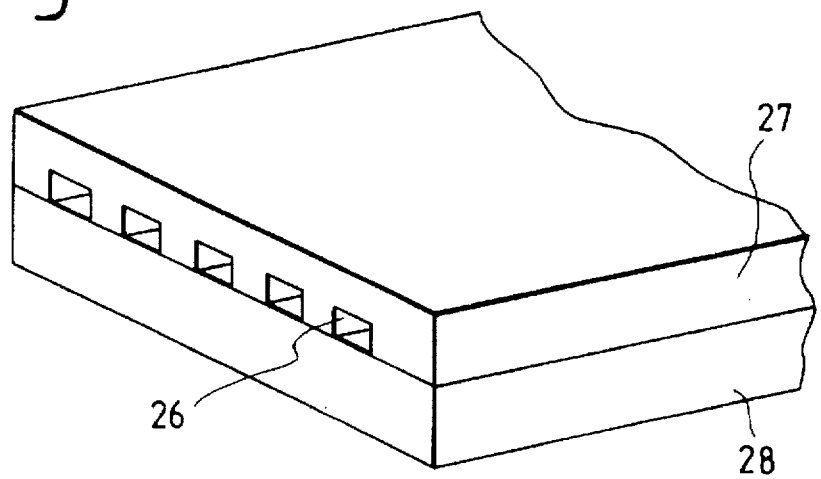
FIG. 3 is a perspective view of the appearance of another head of the ink-jet recording apparatus.

Recording apparatus preferably used in the image-forming process according to the present invention will then be described. In the present invention, an ink-jet recording system in which a recording signal is applied to an ink in a recording head to eject droplets of the ink by the thermal energy generated is preferably used. Examples of the construction of a recording head, which is a main component of such an apparatus, are illustrated in FIGS. 1, 2 and 3.

A head 13 is formed by bonding a glass, ceramic or plastic plate or the like having an ink-passing channel to a heating head 15, which is used for thermal recording and has a heating resistor (the drawing shows a head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice 22 and forms a meniscus 23 due to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24. FIG. 3 schematically illustrates a recording multi-head composed of an array of a number of heads as shown in FIG. 1. This recording head is formed by closely bonding a glass plate or the like 27 having a number of channels to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
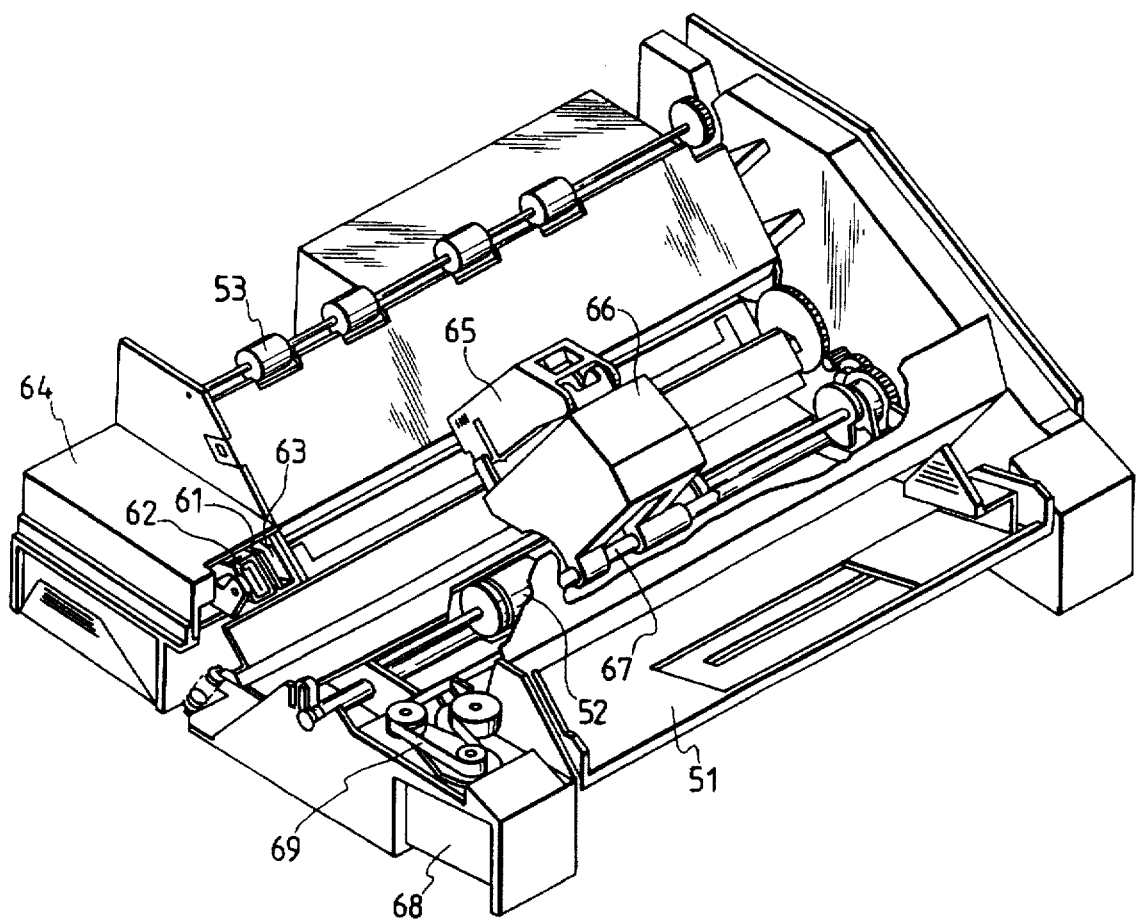
FIG. 4 is a perspective view of an illustrative ink-jet recording apparatus.

FIG. 4 illustrates an exemplary ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such construction, the recording medium is fed to the position opposite to the ejection opening face of the recording head 65, and discharged from a discharge section provided with discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
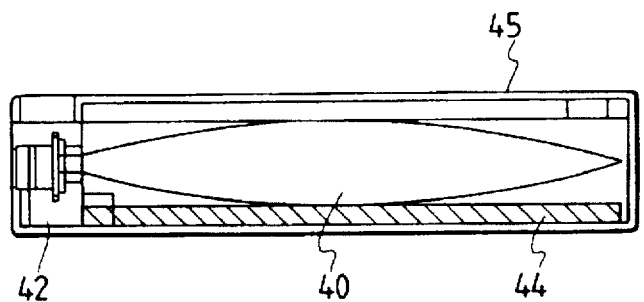
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink.

It is preferable that the ink container portion is formed of a polyolefin, in particular, polyethylene, at its surface with which the ink comes into contact.

The ink-jet recording apparatus used in the present invention is not limited to the apparatus as described above in which the head and the ink cartridge are separately provided. Therefore, a device in which these members are integrally formed as shown in FIG. 6 can also be preferably used.

Figure 6:
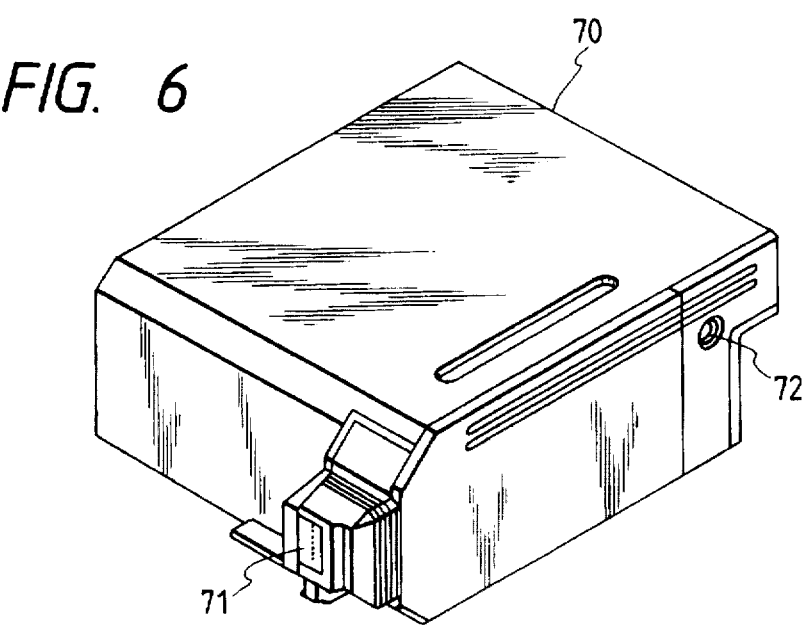
FIG. 6 is a perspective view of a recording unit.

In FIG. 6, reference numeral 70 designates a recording unit, in the interior of which an ink container portion containing an ink, for example, and an ink-absorbing member, is contained. The recording unit 70 is so constructed that the ink in such an ink-absorbing member is ejected in the form of ink droplets through a head 71 having a plurality of orifices. For example, polyurethane may be used as a material for the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66. Incidentally, in the recording apparatus used in the present invention, the ink-jet recording apparatus in which thermal energy is applied to an ink to eject droplets of the ink has been described by way of example. However, the present invention can also be used in other ink-jet recording apparatus such as a piezo-system using a piezoelectric element.

Figure 7:
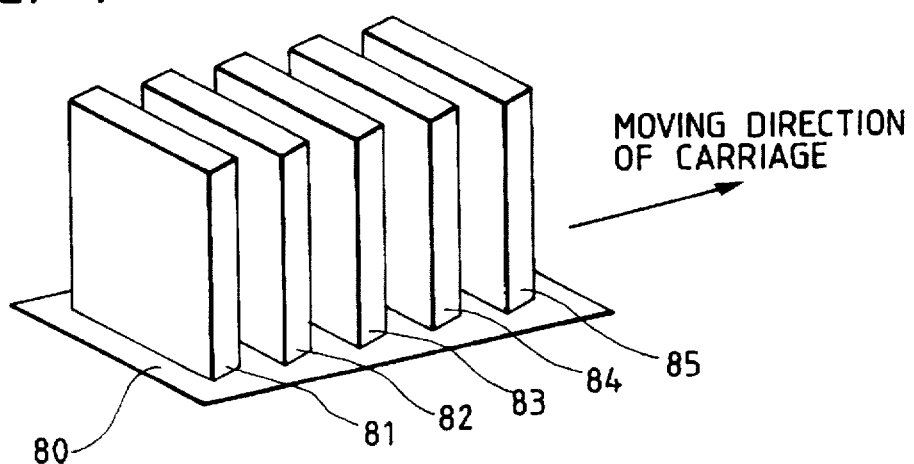
FIG. 7 is a perspective view illustrating a recording part used in examples of the present invention, in which a plurality of recording heads is arranged.
Figure 8:
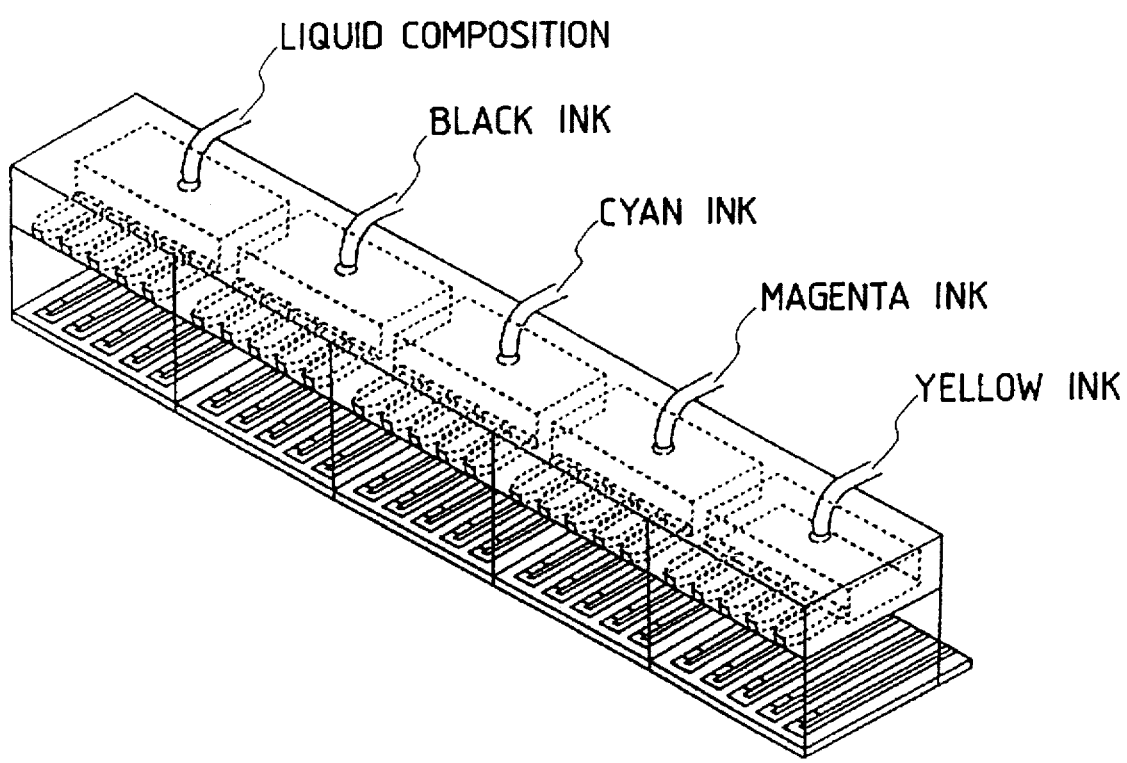
FIG. 8 is a perspective view of another recording head used in the present invention.

In the case where the image-forming process according to the present invention is carried out, for example, a recording apparatus in which five recording heads, each of which has been illustrated in FIG. 3, are arranged on a carriage 80, is used. An example thereof is illustrated in FIG. 7. Reference numerals 81, 82, 83 and 84 indicate recording heads for ejecting inks of yellow, magenta, cyan and black colors, respectively. Reference numeral 85 designates a head for ejecting a liquid composition. The heads are arranged in the above-described recording apparatus and serve to eject the respective recording inks of the different colors according to recording signals. Before the ejection of the inks, the liquid composition is applied in advance to at least portions of recording paper where the recording inks of the different colors are to apply thereto. FIG. 7 shows the case where the five recording heads have been used. However, the present invention is not limited thereto. As shown in FIG. 8, preference is given even to the case where the flow paths of the yellow, magenta, cyan and black inks and the liquid composition are separately provided in one recording head.

It goes without saying that construction of the head may be changed so as to reverse the recording order of the liquid composition and the inks as described above The present invention will hereinafter be described more specifically by the following examples. Incidentally, all designations of "part" or "parts" and "%" as will be used in the following examples mean part or parts by weight and % by weight unless expressly noted. In the following examples, peaks of the molecular weight distribution as to cationic substances were determined by the GPC process making use of polyethylene oxide as a standard. The weight average molecular weight of each of dispersants for pigment inks was determined by the GPC process making use of a styrene polymer as a standard. The average particle diameter of the dispersant was determined in accordance with the dynamic light scattering process.

EXAMPLE 1

The following components were mixed into a solution, and the resultant solution was then filtered under pressure through a membrane filter (Fluoropore Filter, trade name; product of Sumitomo Electric Industries, Ltd.) having a pore size of 0.22 µm. The resulting filtrate was adjusted to pH 4.8 with NaOH, thereby obtaining Liquid Composition A according to this example. The polyallylamine used was synthesized in accordance with the method described in "Kino Zairyo (Functional Materials)", Vol. 5, 29 (1986). The same shall apply to the following examples.

Components of Liquid Composition A:

Polyallylamine hydrochloride (peak of 1.5 parts molecular weight distribution: 8,500)

Diethylene glycol 7 parts

Glycerol 7 parts

Water 84.5 parts.

(Preparation of Inks I)

The following respective components were mixed, and the resultant mixtures were filtered under pressure through a membrane filter (Fluoropore Filter, trade name; product of Sumitomo Electric Industries, Ltd.) having a pore size of 0.22 µm, thereby obtaining Inks Y1, M1, C1 and B1 of yellow, magenta, cyan and black colors, respectively, which contained their corresponding dyes having an anionic group. The Inks Y1, M1, C1 and B1 are called Inks I collectively.

Yellow Ink Y1:

C.I. Direct Yellow 142 2 parts

Thiodiglycol 10 parts

Acetylenol EH (product of Kawaken Fine 0.05 part Chemicals Co., Ltd.)

Water 87.95 parts.

Magenta Ink M1:

C.I. Acid Red 289 2.5 parts

Thiodiglycol 10 parts

Acetylenol EH (product of Kawaken Fine 0.05 part Chemicals Co., Ltd.)

Water 87.45 parts.

Cyan Ink C1:

C.I. Acid Blue 9 2.5 parts

Thiodiglycol 10 parts

Acetylenol EH (product of Kawaken Fine 0.05 part Chemicals Co., Ltd.)

Water 87.45 parts.

Black Ink B1:

C.I. Food Black 2 4.0 parts

Thiodiglycol 10 parts

Acetylenol EH (product of Kawaken Fine 0.05 part Chemicals Co., Ltd.)

Water 85.95 parts.

The thus-obtained Liquid Composition A and Inks I according to this example were used to make UP an ink set according to the present invention, and recording was then conducted on PPC paper (product of Canon Inc.). As an ink-jet recording apparatus, a recording apparatus similar to that shown in FIG. 4 was used. Color images were formed using 5 recording heads as illustrated in FIG. 7. In this recording, Liquid Composition A was first ejected to apply it to the recording paper in advance, after which Inks I were applied. The individual recording heads used herein had a recording density of 360 dpi, and were driven with a drive frequency of 5 kHz. In view of the ejection volume per dot, heads from which an ink can be ejected at a rate of 45 pl/dot was used for the yellow, magenta and cyan inks and the liquid composition, while a head from which an ink can be ejected at a rate of 80 pl/dot was used for the black ink.

Incidentally, these recording conditions are the same throughout examples, which will be described subsequently and use dye inks. The environmental conditions upon printing tests were controlled to 25° C. and 55% RH.

EXAMPLE 2

Liquid Composition B according to this example, which was prepared in the same manner as Liquid Composition A and composed of the following components, and Inks I comprising, as coloring materials, the same dyes as used in Example 1 were used to make up an ink set according to the present invention, and recording was then conducted on PPC paper (product of Canon Inc.) under the same conditions as in Example 1. In this example, Liquid Composition B was also first ejected to apply it to the recording paper in advance, after which Inks I were applied, thereby conducting the recording.

Components of Liquid Composition B:

Polyallylamine hydrochloride (peak of 3 parts molecular weight distribution: 8,500)

Glycerol 7 parts

Ethylene glycol 10 parts

Lauryltrimethylammonium chloride 1 part

Water 79.0 parts.

EXAMPLE 3

Liquid Composition C according to this example, which was composed of the following components, and Inks I comprising, as coloring materials, the same dyes as used (Composition of carbon black dispersion)

Aqueous solution of P-1 40 parts (solid content: 20%)

Carbon black, Mogul L (product of 24 parts Cabot)

Glycerol 15 parts

Ethylene glycol monobutyl ether 0.5 part

Isopropyl alcohol 3 parts

Water 135 parts.

The above-obtained dispersion was thoroughly stirred to obtain ink-jet Black Ink B2 containing the pigment. The final product had a solid content of about 10%.

Yellow Ink Y2:

An anionic polymer, P-2 (styrene-acrylic acid-methyl methacrylate, acid value: 280, weight average molecular weight: 11,000, aqueous solution having a solid content of 20% neutralizing agent: diethanolamine) was used as a dispersant, and the following materials were used to conduct a dispersion treatment in the same manner as in the preparation of Black Ink B2, thereby preparing a yellow dispersion having an average particle diameter of 103 nm.

(Composition of yellow dispersion)

Aqueous solution of P-2 35 parts (solid content: 20%)

C.I. Pigment Yellow 180 (Nova Palm 24 parts Yellow PH-G, product of Hoechst AG) in Example 1 were used to make up an ink set according to the present invention, and recording was then conducted on PPC paper (product of Canon Inc.) under the same conditions as in Example 1. In this example, Liquid Composition C was also first ejected to apply it to the recording paper in advance, after which Inks I were applied, thereby conducting the recording.

Components of Liquid Composition C:

Polyallylamine hydrochloride (peak of 1.5 parts molecular weight distribution: 9,000)

Glycerol 5 parts

Thiodiglycol 5 parts

Benzalkonium chloride 1 part

Water 87.5 parts.

EXAMPLE 4

Inks Y2, M2, C2 and B2 having yellow, magenta, cyan and black colors, respectively, and containing their corresponding pigments and an anionic compound were obtained in the following manner. The Inks Y2, M2, C2 and B2 were called Inks II collectively. An ink set of this example was prepared from Inks II and Liquid Composition A used in Example 1. Using this ink set, recording was conducted on PPC paper (product of Canon Inc.). In this example, Liquid Composition A was first ejected to apply it to the recording paper in advance, after which Inks II were applied, thereby conducting the recording. Individual recording heads used in this example had a recording density of 360 dpi, and were driven with a drive frequency of 5 kHz. In view of the ejection volume per dot, heads from which an ink can be ejected at a rate of 45 pl/dot were used for the yellow, magenta and cyan inks and the liquid composition, while a head from which an ink can be ejected at a rate of 60 pl/dot was used for the black ink.

Incidentally, these recording conditions are the same throughout examples, which will be described subsequently and use pigment inks. The environmental conditions upon printing tests were controlled to 25° C. and 55% RH.
(Preparation Inks II)
Black Ink B2:

An anionic polymer, P-1 (styrene-methacrylic acid-ethyl acrylate, acid value: 400, weight average molecular weight: 6,000, aqueous solution having a solid content of 20%, neutralizing agent: potassium hydroxide) was used as a dispersant. The following materials were charged in a batch-wise vertical sand mill (manufactured by Aimex Company), and glass beads having a diameter of 1 mm were charged as a grinding medium to conduct a dispersion treatment for 3 hours while cooling with water. After the dispersion treatment, the dispersion had a viscosity of 9 cP and a pH of 10.0. The dispersion was centrifuged to remove coarse particles, thereby obtaining a carbon black dispersion having an average particle diameter of 100 nm.

Triethylene glycol 10 parts

Diethylene glycol 10 parts

Ethylene glycol monobutyl ether 1.0 part

Isopropyl alcohol 0.5 part

Water 135 parts.

The above-obtained yellow dispersion was thoroughly stirred to obtain ink-jet Yellow Ink Y2 containing the pigment. The final product had a solid content of about 10%.
Cyan Ink C2:

The anionic polymer, P-1 used in the preparation of Black Ink B2 was used as a dispersant, and the following materials were used to conduct a dispersion treatment in the same manner as in the preparation of the carbon black dispersion described above, thereby preparing a cyan dispersion having an average particle diameter of 120 nm.
(Composition of cyan dispersion)

Aqueous solution of P-1 30 parts (solid content: 20%)

C.I. Pigment Blue 15:3 (Fastgen 24 parts Blue FGF, product of Dainippon Ink & Chemicals, Incorporated)

Glycerol 15 parts

Diethylene glycol monobutyl ether 0.5 part

Isopropyl alcohol 3 parts

Water 135 parts.

The above-obtained cyan dispersion was thoroughly stirred to obtain ink-jet Cyan Ink C2 containing the pigment. The final product had a solid content of about 9.6%.
Magenta Ink M2:

The anionic polymer, P-1 used in the preparation of Black Ink B2 was used as a dispersant, and the following materials were used to conduct a dispersion treatment in the same manner as in the preparation of the carbon black dispersion described above, thereby preparing a magenta dispersion having an average particle diameter of 115 nm.
(Composition of magenta dispersion) Aqueous solution of P-1 20 parts (solid content: 20%)

C.I. Pigment Red 122 (product of 24 parts Dainippon Ink & Chemicals, Incorporated)

Glycerol 15 parts

Isopropyl alcohol 3 parts

Water 135 parts.

The above-obtained magenta dispersion was thoroughly stirred to obtain ink-jet Magenta Ink M2 containing the pigment. The final product had a solid content of about 9.2%.

EXAMPLE 5

An ink set according to this example was made from Inks II comprising their corresponding pigments used in Example 4, and Liquid Composition B used in Example 2. This ink set was used to conduct recording on PPC paper (product of Canon Inc.) under the same conditions as those in Example 4. In this example, Liquid Composition B was first ejected to apply it to the recording paper in advance, after which Inks II were applied, thereby conducting the recording.

EXAMPLE 6

An ink set according to this example was made from Inks II comprising their corresponding pigments used in Example 4, and Liquid Composition C used in Example 3. This ink set was used to conduct recording on PPC paper (product of Canon Inc.) under the same conditions as those in Example 4. In this example, Liquid Composition C was first ejected to apply it to the recording paper in advance, after which Inks II were applied, thereby conducting the recording.

EXAMPLES 7 to 12

Recording was conducted in the same manner as in Example 1 or 4 except that the combinations of the inks and liquid compositions used in Examples 1 to 6 were used as ink sets according to these examples, but their corresponding inks were first applied to the recording paper and their corresponding liquid compositions were then ejected.

The combinations of the liquid compositions and inks used in Examples 1 to 12, and their application order are shown collectively in Table 1.

TABLE 1

Contents of Examples 1 to 12

| Example | Liquid composition | Inks | Order of application |
|---|---|---|---|
| 1 | A | I | Liquid composition |
| 2 | B | I | ↓ |
| 3 | C | I | Ink |
| 4 | A | II | |
| 5 | B | II | |
| 6 | C | II | |
| 7 | A | I | Ink |
| 8 | B | I | ↓ |
| 9 | C | I | Liquid composition |
| 10 | A | II | |
| 11 | B | II | |
| 12 | C | II | |

Evaluation

The recorded images obtained in Examples 1 to 12 were evaluated in accordance with the following evaluation methods and standards.

1. Image density:

After a solid print image was formed with the combination of the liquid composition and the black ink in each ink set and left standing for 12 hours, its reflection density was measured by a reflection densitometer, Macbeth RD915 (manufactured by Macbeth Company) and ranked in accordance with the following standard:

AA: Reflection density was not lower than 1.30;

A: Reflection density was not lower than 1.25 but lower than 1.30;

B: Reflection density was not lower than 1.15 but lower than 1.25; and

C: Reflection density was lower than 1.15.

2. Fixing ability:

After a solid print image of a red color was formed with the combination of the liquid composition and the yellow and magenta inks in each ink set, another white paper sheet was placed on the recorded image by its own weight, thereby measuring the time required until the recorded image no longer transferred to the back side of the paper sheet and no greasing occurred assuming that the time the recording was completed was zero. The time measured was used as a measure of the fixing ability to rank it in accordance with the following standard:

AA: Shorter than 20 seconds;

A: Not shorter than 20 but shorter than 30 seconds;

B: Not shorter than 30 but shorter than 40 seconds;

C: Not shorter than 40.

3. Quality of character:

Black English characters and numerals were printed with the combination of the liquid composition and the black ink in each ink set to visually evaluate the quality of character. The quality of character was ranked as AA where feathering was scarcely conspicuous, A where feathering was somewhat conspicuous, but no problem arose from the viewpoint of practical use, or C where the level was lower than the above.

4. Resistance to bleeding:

Solid print images of yellow, magenta, cyan and black colors were printed in contiguity with one another with the combinations of the liquid composition and the yellow, magenta, cyan and black inks in each ink set in accordance with the same printing mode as the printing mode E (1 pass, one-direction printing) in a Color Bubble Jet Printer BJC-820J (manufactured by Canon Inc.), thereby visually observing the degree of bleeding at boundaries between the inks of different colors. The resistance to bleeding was ranked as AA where bleeding scarcely occurred, A where bleeding slightly occurred, but no problem arose from the viewpoint of practical use, or C where the level was lower than the above.

5. Water fastness:

After solid print images and English characters and numerals of yellow, magenta, cyan and black colors were printed with the combinations of the liquid composition and the yellow, magenta, cyan and black inks in each ink set, and the resulting print samples were left standing for 1 hour, they were then immersed for 10 seconds in tap water of 20° C. Thereafter, they were taken out of the water and air-dried visually evaluate the images fore water fastness. Among the yellow, magenta, cyan and black inks, the ink poorest in water fastness was taken as the evaluation result of water fastness. The water fastness was ranked in accordance with the following standard:

AA: No ink running toward the blank portion of the recording medium occurred, greasing was scarcely recognized, and blurring of the English characters and numerals also scarcely occurred;

A: Ink running toward the blank portion of the recording medium slightly occurred, and the English characters and numerals were somewhat blurred, but no problem arose from the viewpoint of practical use;

C: Ink running toward the blank portion of the recording medium occurred to a significant extent, greasing was also markedly recognized, and marked blurring of the English characters and numerals also occurred.

In the above evaluation, a region of the recording medium, to which the liquid composition is applied, corresponds to the image-forming region with the inks. The printing duty is 100% in each of the liquid compositions and the inks.

The results of the evaluation.-in the above-described evaluation items as to the images obtained in Examples 1 to 12 are shown collectively in Table 2. As apparent from Table 2, in each example, images with good fixing ability, quality of character, image density, resistance to bleeding and water fastness were obtained.

TABLE 2

| Ex. | Image density | Fixing ability | Quality of character | Resistance to bleeding | Water fastness |
|---|---|---|---|---|---|
| 1 | AA | A | A | A | A |
| 2 | AA | AA | AA | AA | AA |
| 3 | AA | AA | AA | AA | AA |
| 4 | AA | A | A | A | AA |
| 5 | AA | A | AA | AA | AA |
| 6 | AA | A | AA | AA | AA |
| 7 | A | A | A | A | A |
| 8 | AA | AA | A | A | AA |
| 9 | AA | A | AA | A | AA |
| 10 | A | A | A | A | AA |
| 11 | AA | A | AA | A | AA |
| 12 | AA | A | AA | A | AA |

EXAMPLE 13

In order to investigate the crusting property of the liquid compositions, recording heads in which Liquid Compositions A, B and C had been separately charged were left standing for 1 week under conditions of 25° C. and 65% RH without capping. After 1 week, whether each liquid composition was smoothly ejected or not was investigated by conducting printing with the combinations of Black Ink B1 of Inks I with Liquid Composition A, B and C, respectively, in the same manner as in Examples 1 to 3, thereby evaluating the crusting property in terms of the water fastness of the resultant printed characters. Namely, if the liquid composition was not smoothly ejected (ejection failure or defective ink-droplet impact occurred) after left standing for 1 week, the water fastness of the printed characters had to be lowered compared with those in Examples 1 to 3.

As the result of the above test, it was confirmed that the printed characters have the same water fastness as in Examples 1 to 3, and so the liquid compositions according to the present invention are difficult to crust even when they are charged in an ink-jet head and then left as they are.

As has been described above, the present invention permits the provision of high-definition images when conducting color ink-jet recording on plain paper, said excellent images being high in print quality in spite of being fixed at high speed, sufficient in image density, high in evenness of solid printed areas, free of bleeding and good in color reproductivity, and having perfectly satisfactory water fastness.

The present invention can also prevent the liquid compositions from crusting, and hence effectively prevent the ejection orifices of the ink-jet recording apparatus from being clogged with such a liquid composition.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A liquid composition containing no coloring material comprising polyallylamine, glycerol and a water-soluble organic solvent other than glycerol, said glycerol being contained in an amount of not less than 5% by weight based on the total weight of the liquid composition.

2. The liquid composition according to claim 1, further comprising at least one water-soluble organic solvent selected from the group consisting of ethylene glycol, diethylene glycol and thiodiglycol.

3. The liquid composition according to claim 1, wherein the polyallylamine has at least one peak in a molecular weight region of not lower than 1,500 but not higher than 10,000 in its molecular weight distribution as measured by means of GPC.

4. The liquid composition according to claim 1, further comprising a cationic substance selected from the group consisting of primary, secondary and tertiary amine salts, which salt has at least one peak in a molecular weight region of not higher than 1,000 in its molecular weight distribution as measured by means of GPC.

5. The liquid composition according to claim 1, wherein the liquid position comprises a cationic substance having at least one peak in a molecular weight region of not higher than 1,000 in its molecular weight distribution as determined by means of GPC, and a cationic substance having at least one peak in a molecular weight region of not lower than 1,500 but not higher than 10,000 in its molecular weight distribution as determined by means of GPC.

6. The liquid composition according to claim 1, further comprising water.

7. The liquid composition according to claim 1, wherein the polyallylamine is contained in a range of from 0.05 to 20% by weight based on the total weight of the composition.

8. The liquid composition according to claim 1, wherein the water-soluble organic solvent other than glycerol is contained in a range of from 5 to 40% by weight based on the total weight of the composition.

9. The liquid composition according to claim 3, wherein the polyallylamine is in the form of the hydrochloride or acetate.

10. An ink set comprising in combination the liquid composition according to any one of claims 1, 2 or 3 to 9 and at least one of yellow, magenta, cyan, black, red, blue and green inks.

11. An ink set comprising in combination the liquid composition according to any one of claims 1, 2 or 3 to 9 and three inks of yellow, magenta and cyan colors.

12. An ink set comprising in combination the liquid composition according to any one of claims 1, 2 or 4 to 9 and four inks of yellow, magenta, cyan and black colors.

13. The ink set according to claim 10, wherein the inks contain an anionic compound.

14. The ink set according to claim 11, wherein the inks contain an anionic compound.

15. The ink set according to claim 12, wherein the inks contain an anionic compound.

16. The ink set according to claim 10, wherein the inks contain a water-soluble dye having an anionic group.

17. The ink set according to claim 11, wherein the inks contain a water-soluble dye having an anionic group.

18. The ink set according to claim 12, wherein the inks contain a water-soluble dye having an anionic group.

19. The ink set according to claim 10, wherein the inks contain a pigment and an anionic compound.

20. The ink set according to claim 11, wherein the inks contain a pigment and an anionic compound.

21. The ink set according to claim 12, wherein the inks contain a pigment and an anionic compound.

22. A process of forming an image, which comprises the steps of (A) applying the liquid composition according to any one of claims 1, 2 or 3 to 9 to at least an image-forming region of a recording medium and (B) applying an ink comprising an anionic compound to the recording medium by an ink-jet system.

23. The image-forming process according to claim 22, wherein the ink-jet system is an On-Demand type ink-jet system.

24. The image-forming process according to claim 22, wherein the liquid composition is applied to the recording medium by an ink-jet system.

25. The image-forming process according to claim 22, wherein the ink-jet system is an ink-jet system in which thermal energy is applied to the ink.

26. The image-forming process according to claim 23, wherein the ink-jet system is an ink-jet system in which thermal energy is applied to the ink.

27. The image-forming process according to claim 24, wherein the ink-jet system is an ink-jet system in which thermal energy is applied to the ink.

28. The image-forming process according to claim 22, wherein the step (A) is conducted prior to the step (B).

29. The image-forming process according to claim 22, wherein the step (A) is conducted subsequently to the step (B).

30. An image forming apparatus comprising the ink set according to claim 10 and an ink-jet means.

31. An image forming apparatus comprising the ink set according to claim 11 and an ink-jet means.

32. An image forming apparatus comprising the ink set according to claim 12 and an ink-jet means.

33. An image forming apparatus comprising the first recording unit equipped with a container part containing the liquid composition according to any one of claims 1, 2 or 3 to 9 and an ejection means therefor, and the second recording unit equipped with container parts separately containing inks comprising an anionic compound and ejection means therefor.

34. The image forming apparatus according to claim 33, wherein the ejection means is an ink-jet means.

35. The image forming apparatus according to claim 30, wherein the ink-jet means is a means in which thermal energy is applied to the ink to form droplets of the ink.

36. The image forming apparatus according to claim 31, wherein the ink-jet means is a means in which thermal energy is applied to the ink to form droplets of the ink.

37. The image forming apparatus according to claim 32, wherein the ink-jet means is a means in which thermal energy is applied to the ink to form droplets of the ink.

38. The image forming apparatus according to claim 34, wherein the ink-jet means is a means in which thermal energy is applied to the ink to form droplets of the ink.

39. A liquid composition comprising a cationic substance, glycerol and a water-soluble organic solvent other than glycerol, said glycerol being contained in an amount of not less than 5% by weight based on the total weight of the liquid composition, and said cationic substance comprising a compound having at least one peak in a molecular weight region of not higher than 1,000 in its molecular weight distribution as determined by means of GPC and a compound having at least one peak in a molecular weight region of not lower than 1,500 but not higher than 10,000 in its molecular weight distribution as determined by means of GPC.

\* \* \* \* \*

UNITED STATES PATENT AND TRADEMARK OFFICE
CERTIFICATE OF CORRECTION

PATENT NO. : 5,624,484
DATED : April 29, 1997
INVENTOR(S) : KATSUHIKO TAKAHASHI, ET AL.

It is certified that error appears in the above-identified patent and that said Letters Patent is hereby corrected as shown below:

COLUMN 2

Line 12, "the-like" should read --the like--.
    Line 22, "More" should read --More- --.

COLUMN 5

Line 12, "AT" should read --at--.

COLUMN 9

Line 62, "AN" should read --an--.

COLUMN 15

Line 66, "UP" should read --up--.

UNITED STATES PATENT AND TRADEMARK OFFICE
CERTIFICATE OF CORRECTION

PATENT NO. : 5,624,484
DATED : April 29, 1997
INVENTOR(S) : KATSUHIKO TAKAHASHI, ET AL.

It is certified that error appears in the above-identified patent and that said Letters Patent is hereby corrected as shown below:

COLUMN 16

Lines 44 through 66 should be deleted.
Line 67, "PH-G, product of Hoechst AG)" should be deleted.

COLUMN 17

Line 54, after "100nm." should read --100 nm.

(Composition of carbon black dispersion)

| | |
|---|---|
| Aqueous solution of P-1 (solid content: 20 %) | 40 parts |
| Carbon black, Mogul L (product of Cabot) | 24 parts |

UNITED STATES PATENT AND TRADEMARK OFFICE
CERTIFICATE OF CORRECTION

PATENT NO. : 5,624,484
DATED : April 29, 1997
INVENTOR(S) : KATSUHIKO TAKAHASHI, ET AL.

It is certified that error appears in the above-identified patent and that said Letters Patent is hereby corrected as shown below:

| | |
|---|---:|
| Glycerol | 15 parts |
| Ethylene glycol monobutyl ether | 0.5 part |
| Isopropyl alcohol | 3 parts |
| Water | 135 parts. |

The above-obtained dispersion was thoroughly stirred to obtain ink-jet Black Ink B2 containing the pigment. The final product had a solid content of about 10 %.

UNITED STATES PATENT AND TRADEMARK OFFICE
CERTIFICATE OF CORRECTION

PATENT NO. : 5,624,484
DATED : April 29, 1997
INVENTOR(S) : KATSUHIKO TAKAHASHI, ET AL.

It is certified that error appears in the above-identified patent and that said Letters Patent is hereby corrected as shown below:

Yellow Ink Y2:

An anionic polymer, P-2 (styrene-acrylic acid-methyl methacrylate, acid value: 280, weight average molecular weight: 11,000, aqueous solution having a solid content of 20%, neutralizing agent: diethanolamine) was used as a dispersant, and the following materials were used to conduct a dispersion treatment in the same manner as in the preparation of Black Ink B2, thereby preparing a yellow dispersion

UNITED STATES PATENT AND TRADEMARK OFFICE
CERTIFICATE OF CORRECTION

PATENT NO. : 5,624,484
DATED : April 29, 1997
INVENTOR(S) : KATSUHIKO TAKAHASHI, ET AL.

It is certified that error appears in the above-indentified patent and that said Letters Patent is hereby corrected as shown below:

having an average particle diameter of 103 nm.

(Composition of yellow dispersion)

| | |
|---|---|
| Aqueous solution of P-2 | 35 parts |
| (solid content: 20 %) | |
| C.I. Pigment Yellow 180 (Nova Palm Yellow PH-G, product of Hoechst AG) | 24 parts -- |

COLUMN 18

Line 23, "Aqueous" should read --¶ Aqueous--.

UNITED STATES PATENT AND TRADEMARK OFFICE
CERTIFICATE OF CORRECTION

PATENT NO. : 5,624,484  Page 6 of 6
DATED : April 29, 1997
INVENTOR(S) : KATSUHIKO TAKAHASHI, ET AL.

It is certified that error appears in the above-indentified patent and that said Letters Patent is hereby corrected as shown below:

COLUMN 20

Line 16, "visually" should read --to visually-- and "fore" should read --for--.
    Line 38, "evaluation.-in" should read --evaluation in--.

COLUMN 21

Line 59, "position" should read --composition--.

COLUMN 22

Line 18, "4" should read --3--.

Signed and Sealed this

Sixteenth Day of December, 1997

Attest:

BRUCE LEHMAN

Attesting Officer    Commissioner of Patents and Trademarks